United States Patent [19]

Wilde

[11] Patent Number: 4,791,818
[45] Date of Patent: Dec. 20, 1988

[54] CANTILEVER BEAM, INSERTABLE, VORTEX METER SENSOR

[75] Inventor: Paul M. Wilde, Long Beach, Calif.

[73] Assignee: ITT Corporation, New York, N.Y.

[21] Appl. No.: 75,796

[22] Filed: Jul. 20, 1987

[51] Int. Cl.$^4$ ............................................. G01F 1/32
[52] U.S. Cl. ............................. 73/861.24; 73/DIG. 4
[58] Field of Search ........: 73/861.22, 861.24, DIG. 4

[56] References Cited

U.S. PATENT DOCUMENTS

| | | | |
|---|---|---|---|
| 4,248,098 | 3/1981 | Sawayama et al. | 73/861.24 |
| 4,437,350 | 3/1984 | Tamura et al. | 73/861.24 |
| 4,627,295 | 12/1986 | Matsubara et al. | 73/861.24 |
| 4,706,503 | 11/1987 | Kamentser | 73/861.24 |

FOREIGN PATENT DOCUMENTS

| | | | |
|---|---|---|---|
| 0200046 | 3/1983 | Fed. Rep. of Germany | 73/861.24 |
| 0061956 | 4/1982 | Japan | 73/861.24 |
| 0154617 | 9/1983 | Japan | 73/861.24 |

Primary Examiner—Herbert Goldstein
Attorney, Agent, or Firm—Menotti J. Lombardi

[57] ABSTRACT

A vortex fluid flowmeter having an outer cantilever beam affixed to a sensor body which has bearing surfaces and a flange that serve to locate and fix the sensor in the meter, the outer beam depending from the sensor body, with the upper portion of the outer beam being a hollow circular tube that serves as a flexure, the lower portion of the beam being solid and forming a vane that intrudes into a slot in the bluff body. An inner cantilever beam is provided in spaced relation within the hollow tube portion and secured therein at a point adjacent the bearing surfaces. A strain gage beam is secured to the inner beam and extends upwardly within the tubular portion, with a flexible link secured between the upper end thereof and the inner adjacent wall of the tubular portion.

8 Claims, 4 Drawing Sheets

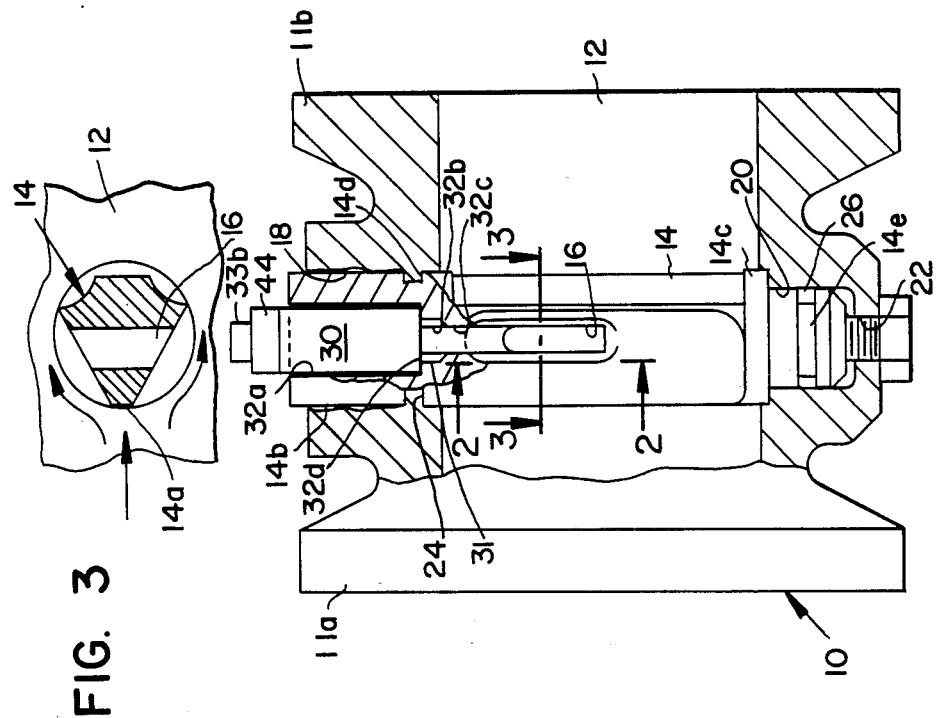
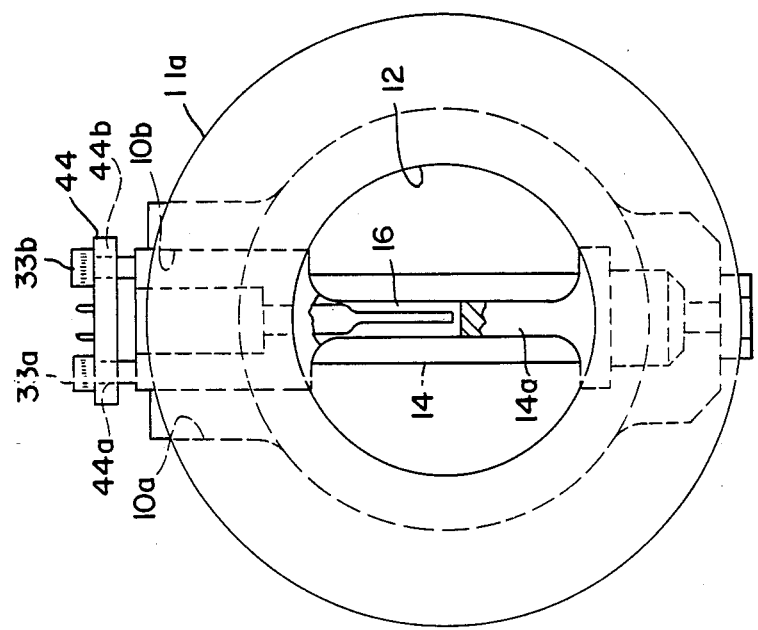

FIG. 5
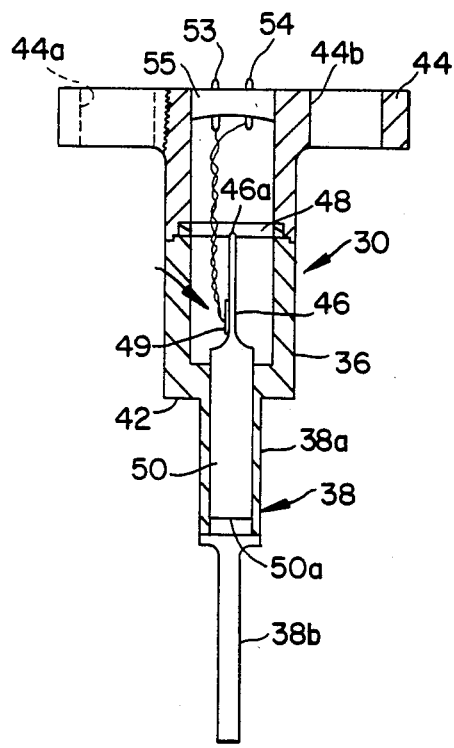
FIG. 6
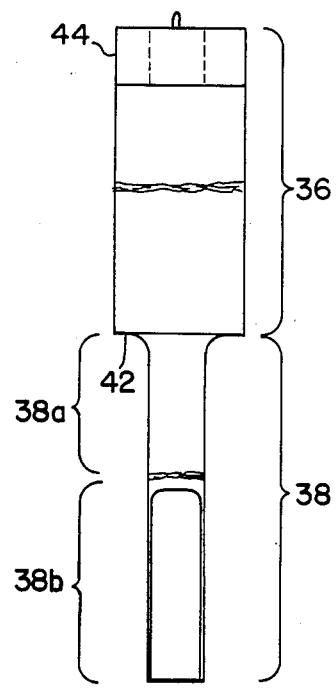
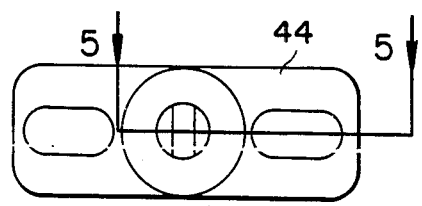
FIG. 4

CANTILEVER BEAM, INSERTABLE, VORTEX METER SENSOR

BACKGROUND OF THE INVENTION

The background of the invention will be discussed in two parts.

1. Field of the Invention

This invention relates to the measurement of the vortex shedding frequency of vortex flow meters, and more particularly to a differential pressure sensor for determining the vortex shedding frequency.

2. Description of the Prior Art

Vortex meters of current design use the localized fluid pressure fluctuations associated with the vortices produced by the bluff body to detect the vortex shedding frequency. The methods used to sense these pressures vary, but most use either a sealed, fluid-filled diaphragm-type differential pressure sensor, or use strain gages or force sensors to detect the forces caused by these pressures in some element of the bluff body.

A fluid-filled diaphragm type sensor is shown and described in U.S. Pat. No. 3,948,098, issued to Richardson, et al., on Apr. 6, 1976, such patent being entitled "Vortex Flow Meter Transmitter including Piezo-electric Sensor".

Fluid filling and sealing of any sensor is a critical and difficult operation that can be costly. Also, the fill fluid limits the temperature range of the sensor, due to the thermal expansion, viscosity and chemical breakdown (or polymerization) characteristics of the fluid. The stresses in the bluff body tend to be rather low, and while it is possible to design higher stresses into some element of the bluff body, or bodies, the most highly stressed components are exposed to the process media, and their materials must be chosen for corrosion properties and not for strength and fatigue properties.

Furthermore, it is difficult to make the same sensing scheme work for all sizes of meters. Diaphragm sensors cannot be made small enough to fit in the bluff bodies of the smallest meters, so the sensor must be relocated or the geometry of the bluff body must be changed. The high stress bluff body elements in some designs become too small to be fitted with strain gages, or the forces or motions generated become too small in the small meters, or too large in the large meters for the force sensor used.

U.S. Pat. No. 3,796,096, entitled "Vortex Flowmeter," was issued to Sielaff et al on Mar. 12, 1974, and discloses a flow meter having a plate like member pivotally suspended about a central axis within a conduit, with a light beam photoelectric detection arrangement for measuring the frequency of oscillation of the plate like member.

U.S. Pat. Nos. 3,867,839; 3,888,120; 3,946,608; and 4,033,189 are all commonly owned and disclose vortex-type flowmeters utilizing a conduit forming a passage for the fluid to be measured, with an obstacle assembly mounted therein, the obstacle assembly including a front section, and a rear section. The front section is configured in the form of a triangularly cross-sectioned block extending across the conduit and fixed to opposites sides thereof, with the apex of the block facing the incoming fluid. The rear section is shorter in width and is cantilevered from the front section by an interconnecting flexible web portion attached to the rear of the block. The rear section is provided with a rear tail extending in the direction of fluid flow. A gap is formed intermediate the front and rear sections, with the gap tending to trap the vortices, while strengthening and stabilizing the vortex street produced thereby. Oscillations in the rear section are sensed by different methods.

Other patents which disclose vortex flowmeters, and are exemplary of the prior art are: U.S. Pat. No. 3,992,939, entitled "Apparatus for Producing a Mass Flow Rate Signal With or Without a Density Signal," issued to November on Nov. 23, 1976; U.S. Pat. No. 4,201,084 entitled "Vortex Flow Meter," issued to Ito et al on May 6, 1980; U.S. Pat. No. 4,339,957, entitled "Vortex-Shedding Flowmeter with Unitary Shedder/Sensor," issued to Herzl on July 20, 1982; and U.S. Pat. No. 4,380,935, entitled "External Sensing Vortex Flowmeter," issued to Sgourakes et al on Apr. 26, 1983.

In such prior art meters, strain gauges or piezoelectric sensors are coupled to flexing or vibrational elements for providing inputs to electrical circuitry which inputs are converted to a flow rate. In most of such prior art meters, the sensing element, usually a piezoelectric ceramic element, is exposed to the full temperature of the process fluid. Furthermore, many of the designs are as sensitive to accelerations from pipeline vibrations as they are to vortex pressures. In addition, many of the prior art meters require complete disassembly of the meter if the sensor should fail.

In accordance with an aspect of the present invention, it is an object to provide a new and improved cantilever beam, insertable vortex meter sensor.

SUMMARY OF THE INVENTION

The foregoing and other objects are accomplished by providing a fluid flowmeter having a cantilever beam, insertable, vortex meter sensor including a sensor body which has bearing surfaces and a flange that serve to locate and fix the sensor in the meter. An outer cantilever beam extends down from the sensor body, with the upper portion of the outer cantilever beam being a hollow circular tube that serves as a flexure and as the pressure boundary of the sensor. The lower portion of the outer beam is solid and is flattened to form a paddle or vane that is thin enough to fit in a slot in the bluff body, which extends diametrically across the conduit within the meter housing. An inner cantilever beam is provided in spaced relation within the hollow tube portion and secured therein such as by welding or brazing at a point adjacent the bearing surfaces. A bar-shaped strain gage beam is secured to or integrally formed with the inner cantilever beam and extends upwardly within the tubular portion, with a flexible link secured between the upper end thereof and the inner adjacent wall of the tubular portion. A strain gauge is mounted to the face of the strain gauge beam with the leads extending through a glass seal at the upper open end of the tubular portion of the sensor body, the seal also acting as a secondary pressure boundary should the outer beam fail. By appropriate dimensioning, the sensor assembly may be made insensitive to pipeline vibrations.

Other objects, features and advantages of the invention will become apparent from a reading of the specification, when taken in conjunction with the drawings, in which like reference numerals refer to like elements in the several views.

BRIEF DESCRIPTION OF THE DRAWINGS

FIG. 1 is a side elevational view, partially broken away and partially in cross-section, of the vortex meter assembly according to the invention;

FIG. 2 is an end view of the meter assembly of FIG. 1, partially in cross-section as viewed along line 2—2 of FIG. 1;

FIG. 3 is a cross-sectional view of the bluff body of the meter assembly of FIG. 1, as viewed generally along line 3—3 thereof;

FIG. 4 is a top plan view of the sensor assembly used in the meter assembly of FIG. 1;

FIG. 5 is a side view of the sensor assembly of FIG. 4, partially in cross-section as viewed along line 5—5 thereof;

FIG. 6 is an end view of the sensor assembly of FIG. 4 as viewed from the right of FIG. 5;

DESCRIPTION OF THE PREFERRED EMBODIMENT

Figure 8:
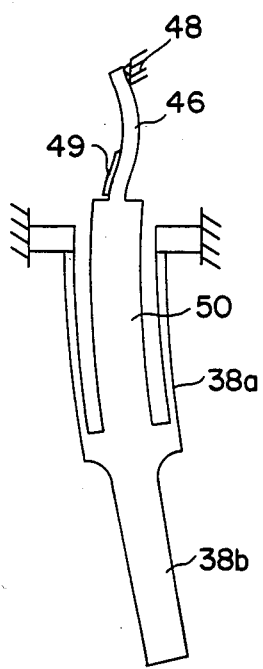
FIG. 8 is a diagrammatic view of the sensor assembly of FIG. 4 under inertia loading.

Referring now to the drawings, and particularly to FIGS. 1 through 3, there is shown a vortex meter assembly including a meter housing, generally designated 10, the housing 10 having flanged ends 11a and 11b for connection to a fluid flow pipeline, and a generally centrally disposed fluid flow opening or tubular conduit 12 of generally circular cross-section, with the fluid flow being directed in the direction of the axis of the conduit 12.

A bluff body, generally designated 14, is secured to the housing 10, within the conduit 12 in a direction extending transverse to the direction of fluid flow, that is, generally perpendicular to the axial centerline of the conduit 12. Although not shown, the bluff body 14 may also be formed integrally with the housing 10. As is known in the art of vortex meters, the bluff body 14 acts as an obstacle to fluid flow, and has a cross-sectional configuration intended to give rise to periodic vortices, the sensing and measurement of which can be translated to fluid flow rates. Such bluff bodies, for example may have a wedge-shaped configuration with the apex 14a of the wedge being located for initial contact with the oncoming fluid, the fluid flow direction being depicted by the arrows in FIG. 3. The vortices created by the obstacle, or bluff body 14, cause the fluid pressure to be different on the two sides of the bluff body 14. A sensor well in the form of a slot 16 extends through the bluff body 12 in a direction perpendicular to the direction of fluid flow and perpendicular to the longitudinal axis of the bluff body 14.

As depicted in FIGS. 1 through 3, the bluff body 14 may be formed, such as by machining a cylindrical metal stock, with the opposite ends 14a and 14b being generally circular in cross-section. The housing 10 is provided with a diametrically extending bore 18 and an aligned stepped cylindrical recess 20 configured and dimensioned for receiving the ends 14b and 14c, respectively, of the bluff body 14. During machining, a pilot hole 22 is formed in diametrically opposed axially aligned relation to the bore 18.

The upper end 14b of the bluff body 14 is generally circular in cross-section, and is provided with a circumferential recess 14d, for receiving a sealing member, such as O-ring 24. The lower end 14c is formed as a stepped cylindrical end, for mating coaction within the stepped recess 20, the larger diameter portion of end 14c being engaged on a shoulder 20a of the lower recess 20. The reduced diameter portion of end 14c has a circumferential recess 14e for receiving a sealing member, such as O-ring 26, for sealingly receiving the end 14c within the recess 20 of housing 10. To secure the bluff body within the housing 10, a bolt member 28 extends through the pilot hole 22 into a threaded aperture along the longitudinal axis of the bluff body 12.

Referring also to FIGS. 4 through 6, the upper end 14b of the bluff body has a hollowed out interior receptacle means for receiving the differential pressure sensor assembly, the receptacle being generally designated 30. The sensor assembly receiving interior is generally designated 32, and includes an enlarged diameter generally circular upper receptacle portion 32a, a counterbored intermediate portion 32b and a lower portion 32c, the lower receptacle portion 32c being a throughhole into slot 16 of the bluff body 14. The junction of the upper portion 32a and the intermediate portion 32b forms a bearing surface or shoulder 32d, with the overall configuration of the interior 32 being dimensioned and configured for matingly conforming to the outer configuration of the sensor assembly 30, with a sealing member, such as O-ring 34 being received about a lower portion of the sensor assembly 30 within the intermediate interior portion 32b below the shoulder 32d.

As shown in FIGS. 4 through 6, the cantilever beam sensor assembly 30 includes a sensor body 36 fixedly attached to an outer cantilever beam member 38, the sensor body, as shown in FIG. 6 being approximately the upper half, with the outer beam member 38 being the balance of the length of the device.

The sensor body 36 of the cantilever beam sensor 30 is provided with bearing surfaces 42 and a flange 44 that serve to locate and fix the sensor assembly 30 in the meter housing 10. By reference also to FIG. 1, the bearing surface 42 is dimensioned for positioning on the bearing surface formed by shoulder 32d formed within the interior 32 of the upper end of the bluff body 14. A sealing member, such as an O-ring 31 encircles the reduced diameter adjacent surface of the upper portion 38a of the outer beam member 38 for providing a fluid tight connection. The flanges 44 have apertures 44a and 44b for receiving bolt members 33a and 33b therethrough, which bolt members engage threaded apertures 10a and 10b in the body of the meter housing 10. The diameter of the upper portion 32a of the sensor receiving opening 32 is slightly greater than the outer diameter of the portion of the sensor body 36 received therein.

The outer cantilever beam member 38 extends down from the sensor body 36 in axial alignment therewith, that is, the longitudinal centerline of the outer beam member 38 is along the longitudinal centerline of the sensor body 36. The upper portion 38a of this cantilever beam member 38 is a hollow circular tube that serves as a flexure and as the pressure boundary of the sensor assembly 30. The lower portion of the outer beam is solid and is flattened to form a paddle or vane 38b, the long dimension of which extends in general alignment with the axis of the conduit 12. The length of the outer beam member 38 and the dimensions and location of the slot 16 are such that the vane 38b extends into the slot 16 for being acted upon by the vortices created during fluid flow. With the configuration in accordance with the present invention, one size of sensor may readily be configured to fit a large number of sizes of flowmeters, that is, the vane 38b is configured and dimensioned such that it is thin enough to fit in the slot 16 of the bluff body 14 of the smallest size of meter to be built.

The inner cantilever beam 50 is fixed by welding or brazing at the lowermost end thereof into the outer cantilever beam 38 and extends upward into the sensor body 36 in axial alignment and in concentric relation therewith, the welding or brazing being at a point adjacent the upper end of the inner beam member 50, preferably in proximate relation to the plane of the bearing surface 42. The inner cantilever beam member 50 is circular in cross-section and can be hollow or solid. The inner beam member 50 depends into, and is in concentric relation with the inner wall of the interior of the outer beam 38, with a clearance gap between the periphery of the outer wall of inner beam member 50 and the interior wall of the outer beam member 38. The lower end 50a of the inner beam member 50 terminates short of the upper end of the solid vane member 38b, that is the ends are in spaced relation. With the peripheral and endwise spacing, the inner beam member 50 is allowed to flex without contacting the interior wall of the sensor body 36 or the interior wall of the outer beam member 38.

A strain gage beam member 46 is shown extending up from the top of the inner beam member 50 in alignment with the longitudinal centerline thereof. The strain gage beam member 46 is preferably bar-shaped with the long width dimension being in coplanar relation with the long width dimension of the vane 38b. As shown in FIG. 5, the short width dimension of the strain gage beam member 4 is much less than the diameter of the inner beam member 50 to which it is integrally attached, the dimensional ratio being about one-quarter. The reason for this will be explained hereafter.

The upper end 46a of this strain gage beam 46 is simply supported to the sensor body by suitable means, such as a flexible link 48 that is welded or brazed in place, first, to the end 46a of the beam member 46 and second to the adjacent interior wall of the sensor body 36. The link 48 extends generally perpendicular to the longitudinal centerline of the strain gage beam 46.

An electrical sensor means, such as a strain gage 49 is affixed to the broad surface of the beam member 56, with the electrical signal produced by the strain gage 49 (in this case a piezoelectric ceramic element) being transmitted by wires 53, 54 out of the sensor body 36 through a glass seal 55, which serves as a secondary pressure boundary if the outer beam member 38 should fail.

All of the parts, to wit, the housing 10, the bluff body 14, the sensor body 36, the outer beam member 38, the inner beam member 50 and the strain gage beam member 46 are formed of metallic material suitable for the particular environment, preferably of the same material to avoid differences in thermal expansion. Dimensionally, by way of example only, for a two inch vortex meter assembly, the conduit 12 will have a diameter of approximately two inches, with the overall length of the sensor assembly 30 being approximately two inches. The overall length of the outer beam member 38 is approximately 1.1 inches, with an approximately 0.60 inch length of the vane 38b, and a thickness of about 0.066 inch. The outer diameter of the upper portion 38a of the outer beam member 38 is approximately 0.186 with the inner wall thereof having a diameter of about 0.140 inch. The outer diameter of the inner beam member 50 is about 0.120 inch, resulting in an annular clearance gap of 0.010 inch between the inner beam member 50 and the adjacent interior wall of the upper portion 38a of the outer beam member 38.

In operation, with fluid flowing through the conduit 12, the wedge shaped bluff body 14 acts as an obstacle to the oncoming fluid flow, resulting in vortices in the area of the slot 16, which cause the fluid pressure to be different on the two sides of the bluff body 14. This fluctuating pressure difference acts immediately on the vane 38 and thus on the outer beam 38 and flexes it from side to side. When the outer beam member 38 is flexed to the left by fluid pressure, the inner beam member 50 rotates clockwise, and the upper end of the inner beam 50 moves to the right, as viewed in FIG. 5. The rotation and motion of the upper end of the inner beam member 50 also tends to move the upper end 46a of the strain gage beam member 46 to the right, but since this end 46a is simply supported in the sensor body 30 by the link 48 and cannot move, the beam member 46 is bent and the resulting stress is picked up by the strain gage 49. Because the strain gage beam member 46 is much thinner than the inner beam member 50, the stress in these two beams is concentrated in the strain gage beam 46. During testing, calculations indicate that the maximum stress in the strain gage beam member 46 can be 60 percent of the maximum stress in the outer beam member 38, with reasonable component dimensions.

The sensor 30, in accordance with the present invention, has a low response to vibration, which is caused by the fact that while fluid pressures can act directly only on the outer beam member 38, inertia forces caused by pipeline vibrations act on all three beams 38, 50 and 46. When the sensor 30 is accelerated to the right, the outer beam member 38 flexes to the left and causes the inner beam member 50 to rotate clockwise, but unlike the case for fluid pressure loading of the outer beam member 38 discussed above, the upper, or strain gage beam member 46 is also affected by the acceleration, and it also flexes to the left. This tends to relieve the stress in the strain gage beam member 46. If the inner beam 50 flexes just the right amount, the region of the strain gage beam 46 where the strain gage 49 is bonded will see no stress at all.

Figure 7:
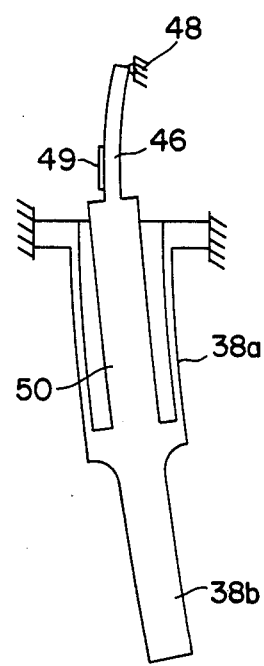
FIG. 7 is a diagrammatic view of the sensor assembly of FIG. 4 showing the deflections under differential pressure loading.

This effect is illustrated diagrammatically in FIGS. 7 and 8, which, show respectively, the deflections of the components of the sensor assembly 30 under differential pressure loading (FIG. 7) and inertia loading (FIG. 8). The dimensional spacing between the inner beam 50 and the outer beam 38, along with the deflections, have been somewhat exaggerated for illustration, and the lower end of inner beam 50 is drawn as continuous with the vane portion 38b of the outer cantilever beam member 38.

Under differential pressure loading, as depicted in FIG. 7, a pressure acting downwards on the outer beam 38 and vane 38b deflects them downwards. This causes the inner beam 50 to rotate clockwise and the end of inner beam 50 to move upwards. The rotation and movement of the end of the inner beam 50 bends the strain gage beam 46 into an S-shaped curve, and the resulting strain is converted into an electrical signal by the piezoelectric ceramic element 49.

As previously stated, differences in pressure act only upon the outside of the cantilever beam 38, while inertia forces caused by pipeline vibration act upon all three beams 38, 50 and 46. FIG. 8 depicts the exaggerated response of the sensor 30 to a uniform acceleration. When the sensor 30 is accelerated upwards, such as would be caused by pipeline vibration, the vane 38b and the outer beam 38 deflect downwards, similar to FIG. 7, and cause the inner beam 50 to rotate counterclockwise, but, unlike the case of pressure loading, the inner beam 50 is also deflected downwards by inertia forces. This tends to relieve the stress in the strain gage beam 46. The strain gage beam 46 is usually the slenderest beam and tends to bend most sharply. With all three beams, that is outer beam 38, inner beam 50 and strain gage beam 46, sized and dimensioned correctly, there will be a point of inflection in the elastic curve of the strain gage beam 46 which occurs where the strain gage element 49 is located, so that the average stress in the element 49 will be zero. With these conditions met, the sensor 30 will have no response to acceleration from pipeline vibrations so long as these vibrations are significantly below the natural frequency of the sensor 30, which is about 3000 to 5000 htg, depending on the outer beam 38a wall thickness. Most pipeline vibration falls well below this frequency.

With the sensor 30 constructed as described, the sensor may readily be constructed to be made insensitive to pipeline vibration by appropriate dimensioning of the deflectable components and judicious positioning of the strain gage 49. Normally, pipeline vibration will impart vibration on the sensor 30 in three planes, that is an up and down plane, a plane in axial alignment with flow and a plane disposed radially relative to flow. By placing the strain gage 49 on the strain gage beam 46 at a position where it is sensitive to the created vortices and insensitive to meter housing 10 vibration in any of these three planes, a zero stress sensor can readily be constructed.

Figure 9:
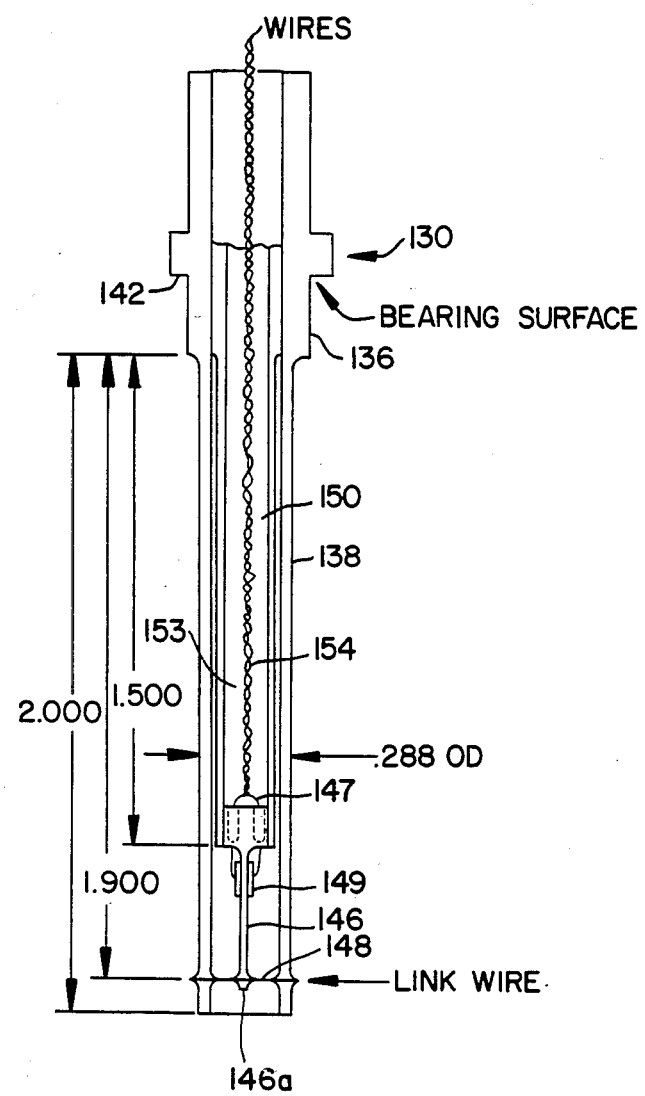
FIG. 9 is a side elevational view, partially in cross-section of an alternate embodiment of the sensor assembly of FIG. 4.

Other configurations that use this principle to reduce vibration response are possible, and an alternate embodiment is shown in FIG. 9. In this particular configuration, the sensor assembly 130 has a sensor body 130 coupled to, or formed with, the outer beam member 138, which is tubular, the inner wall thereof being coextensive with the hollow inner wall of the sensor body 136. The inner beam 150 is also tubular and provided with an enlarged diameter end 150 for securing to the inner wall of the housing body 136 adjacent the bearing surface 142.

In contrast to the first embodiment, the strain gage beam member is suspended downwardly from the inner beam member 150 along a diameter thereof, this suspension being effected by a plug member 147 configured for both closing the lower open end of the inner beam member 150 and supporting the strain gage beam member 146. The lower end 146a of the strain gage beam member 146 is suitably supported by means of a flexible link wire member 148 secured to the end 146a, such as by brazing, with opposite ends of link member 148 secured to opposing walls of the lower end of the outer beam member 138. The attachment may be effected by simply providing aligned apertures on a diameter of the outer beam member 138 and the center of the lower end 146a of the strain gage beam member 146, and passing the link wire member therethrough, and bonding with the end 146a substantially centered. Strain gage sensor means are shown on both opposite surfaces of the strain gage beam member 146 for providing electrical signals through electrical leads 153 and 154. In this embodiment, the plug member 147 and the junction of the enlarged diameter upper end of the inner beam 150 with the interior wall of the sensor body 136 provide the pressure boundaries for the sensor 130.

In accordance with the invention, the cantilever sensors 30 and 130 can be readily inserted and removed from its well in the bluff body 14 with no other disassembly of the meter 10 being required, thus making replacement or cleaning easy. It can easily be made small enough to fit into meters as small as ¾-inch pipe size and still work in the largest size meter. As a consequence, unlike the prior art flow meters, one sensor 30 or 130 can accommodate flow meters 10 of a large range of sizes.

The stress that the strain gage 49 or 149 sees can be a large fraction of the maximum fiber stress of the elements exposed to the process media. This provides for a better combination of sensitivity and fatigue life. The sensor 30 or 130 does not require a fluid fill, and since the strain gage 49, in the first embodiment, can be outside of the process fluid wetted area, it can be actively cooled to allow very high temperature operation of the meter 10. Finally, the sensor can be made insensitive to pipeline vibration by correctly sizing the different component parts, with selective placement of the strain gage member to provide inertial equilibrium, or zero stress, under normal pipeline vibration.

Furthermore, with the cantilever beam sensor 30 according to the invention, it is also possible to configure the outer beam member 38 to serve as the bluff body and, as previously discussed, the bluff body may be integrally formed with the housing. This would eliminate any problem which may arise as a result of the sensor well slot 16 of the bluff body 14 filling up with particulate matter, but could eliminate many of the advantages of the insertable sensor concept.

In the context of the present specification, the terms upward, downward, suspended, or depending, and like directional terms, are used with reference to the orientation in the drawings and are not intended to be limiting. While there have been shown and described preferred embodiments, it is to be understood that various other adaptations and modifications may be made within the spirit and scope of the invention.

What is claimed is:

1. A vortex fluid flowmeter comprising:
 housing means having a conduit for fluid flow therethrough, said housing means including a bluff body extending through said housing means into said conduit;
 receptacle means being formed in said buff body and having shoulder means;
 sensor body means having bearing means forming a bearing surface, said sensor body means being receivable within said receptable means with said bearing surface on said shoulder means, said sensor body means having a hollow interior portion;
 means for securing said sensor body means to said housing means;
 first beam means affixed to said sensor body means in general alignment therewith and having a vane portion extending into said conduit for contact with the fluid flow therein, said first beam means having an at least partially hollow portion;

second beam means in spaced relation within the at least partially hollow portion of said first beam means, said second beam means being secured to said sensor body means at a point adjacent the bearing surface; and flexure sensing means secured to said second beam means for providing a signal indicative of the flexing of said first beam means upon flow of fluid through said conduit, said flexure sensing means includes a bar-shaped strain gage beam member having one end fixed to said second beam means and the other end, being a free end, fixed by a flexible link member secured to an interior wall portion of said sensor body means, and electrical sensing means located on the elongated portion of said bar shaped beam member.

2. The flowmeter of Claim 1 wherein said at least partially hollow portion of said first beam means is a tubular portion of circular cross-section and said second beam means is a beam member with a circular cross-section in spaced concentric relation to said tubular portion.

3. The flowmeter of Claim 2 wherein the vane portion of said first beam means extending into said conduit for fluid flow contact has the long width dimension thereof positioned in a direction in general alignment with the fluid flow direction.

4. The flowmeter of Claim 3 wherein said bar-shaped strain gage beam member is in general alignment with said second beam member, and the thickness of said bar-shaped member being much less than the thickness of said second beam member.

5. The flowmeter of Claim 4 wherein said electrical sensing means is a strain gage for providing an electrical signal indicative of the flexing of the portion of said first beam means within said conduit.

6. A vortex fluid flowmeter comprising in combination:

housing means having a conduit for fluid flow therethrough;

bluff body means within said housing means and extending within said conduit, said bluff body means having slot means therethrough extending in a direction generally perpendicular to the direction of fluid flow;

receptacle means having shoulder means within said bluff body means;

sensor body means having bearing means forming a bearing surface, said sensor body means being receivable within said receptacle means with said bearing surface on said shoulder means;

means for securing said sensor body means to said housing means;

outer beam means affixed to said sensor body means and having a vane portion extending into said slot means for fluid flow contact, said outer beam means having at least the upper portion thereof formed as a hollow circular tube that serves as a flexure;

inner beam means in spaced relation within the hollow upper portion of said outer beams means and secured therein at a point adjacent the bearing surface;

flexure sensing means secured to said inner beam means for providing a signal indicative of the flexing of said lower portion of said first beam means upon flow of fluid through said conduit;

said flexure sensing means is a strain gage beam member and a piezoelectric strain gage in contact therewith;

said inner beam means has a generally circular cross-section and is in concentric relation within the upper portion of said outer beam means, and said strain gage beam member is generally bar-shaped and has a bar thickness much less than the diameter of said inner beam means; and said sensor body means has a generally hollow interior portion with said strain gage beam member extending therein, and a free end of said strain gage beam member is supported by a flexible link member secured thereto and to the adjacent inner wall of said sensor body means.

7. In a vortex sensor assembly for insertion into a flowmeter housing having a conduit for fluid flow there-through, with the housing having opening means with a shoulder portion through a wall thereof, said sensor assembly comprising the combination of:

sensor body means having bearing means, said sensor body means being receivable within the opening means of said housing with said bearing means on said shoulder portion;

first beam means having a hollow portion and being affixed to said sensor body means and having a vane portion for extending into said conduit for flexure in response to fluid flow;

second beam means in spaced relation within the hollow portion of said first beam means and being secured therein at a point adjacent said bearing means;

flexure sensing means operatively coupled to said second beam means for providing a signal indicative of the flexing of said first beam means upon flow of fluid through said conduit;

said flexure sensing means include a strain gage beam member and a piezoelectric strain gage in contact therewith;

said second beam means has a generally circular cross-section and is in concentric relation within the upper portion of said first beam means, and wherein said strain gage beam member is generally bar-shaped and has a bar thickness much less than the diameter of said second beam means;

said sensor body means has a generally hollow interior portion with said strain gage beam member extending therein, and the free end of said strain gage beam member is supported by a flexible link member secured thereto and to the adjacent inner wall of said sensor body means; and said first, second and third beam means are configured, dimensioned and arranged for providing substantially zero stress on a portion of said third beam means in response to vibration of said flowmeter housing caused by pipeline vibration, and said electrical sensing means is placed on said portion of said third beam members.

8. A vortex sensor assembly for insertion into a flowmeter housing having a conduit for fluid flow there-through, with the housing having opening means through a wall thereof, said sensor assembly comprising in combination:

sensor body means receivable within the opening means of said housing;

outer beam means operatively coupled to said sensor body means and having a vane portion for extending into said conduit for flexure in response to fluid flow;
inner beam means operatively interconnected to said outer beam means for flexure upon flexure of said outer beam means;
flexure sensing means operatively coupled to said inner beam means for providing a signal indicative of the flexing of said outer beam means upon flow of fluid through said conduit;
said flexure sensing means comprising a strain gage beam member and a piezoelectric strain gage in contract therewith;
said inner beam means has a generally circular cross-section and is in concentric relation within the upper portion of said outer beam means, and wherein said strain gage beam member is generally bar-shaped and has a bar thickness much less than the diameter of said inner beam means;
said sensor body means has a generally hollow interior portion with said strain gage beam member extending therein, and a free end of said strain gage beam member is supported by a flexible link member secured thereto and to the adjacent inner wall of said sensor body means; and
whereby said piezoelectric strain gage is positioned on the longitudinal portion of said bar-shaped beam member at a position sensitive to vortices and insensitive to vibration of said flowmeter housing.

* * * * *